United States Patent [19]

Feldmann et al.

[11] Patent Number: 5,129,712
[45] Date of Patent: Jul. 14, 1992

[54] METHOD OF AND AN APPARATUS FOR REGULATING AN ELECTRICALLY REGULATED BRAKE CIRCUIT OF A MULTI-CIRCUIT BRAKE MECHANISM

[75] Inventors: Joachim Feldmann, Neustadt; Manfred Schult, Garbsen; Gerhard Warendorf, Wedemark, all of Fed. Rep. of Germany

[73] Assignee: WABCO Westinghouse Fahrzeugbremsen GmbH, Hanover, Fed. Rep. of Germany

[21] Appl. No.: 447,303

[22] Filed: Dec. 6, 1989

[30] Foreign Application Priority Data

Dec. 12, 1988 [DE] Fed. Rep. of Germany ....... 3841749

[51] Int. Cl.$^5$ ...................... B60T 13/66; G01L 13/02
[52] U.S. Cl. ........................ 303/15; 303/52; 303/DIG. 3; 303/3; 303/7
[58] Field of Search ........................ 303/13, 14, 15, 50, 303/7, 8, 52, 100, 56, DIG. 3, DIG. 4, 3, 20, 6.01, 9.61, 22.1; 188/156, 3 R, 3 H

[56] References Cited

U.S. PATENT DOCUMENTS

| | | | |
|---|---|---|---|
| 3,887,238 | 6/1975 | Bennett | 303/7 |
| 3,900,227 | 8/1975 | Smith et al. | 303/7 |
| 3,951,464 | 4/1976 | Donahue et al. | 303/7 |
| 4,002,373 | 1/1977 | Mori | 303/15 X |
| 4,428,620 | 1/1984 | Warwick et al. | |
| 4,603,919 | 8/1986 | Grauel et al. | 303/52 X |
| 4,784,442 | 11/1988 | Petersen | 303/15 |
| 4,818,036 | 4/1989 | Reinecke | 303/15 X |
| 4,819,992 | 4/1989 | Angelillo et al. | 303/15 X |
| 4,861,115 | 8/1989 | Petersen | 303/14 X |

FOREIGN PATENT DOCUMENTS

| | | |
|---|---|---|
| 0088911 | 8/1986 | European Pat. Off. . |
| 2218315 | 10/1972 | Fed. Rep. of Germany . |
| 2202105 | 8/1973 | Fed. Rep. of Germany . |
| 2363636 | 6/1974 | Fed. Rep. of Germany . |
| 2544224 | 4/1976 | Fed. Rep. of Germany . |
| 3344252 | 6/1984 | Fed. Rep. of Germany . |
| 3326448 | 2/1985 | Fed. Rep. of Germany . |
| 3504096 | 8/1986 | Fed. Rep. of Germany . |
| 502909 | 3/1971 | Switzerland . |
| 529644 | 12/1972 | Switzerland . |

OTHER PUBLICATIONS

Westinghouse, Ausgabe Aug. 1973, 461-106-000, pp. 1-3.

Primary Examiner—Douglas C. Butler
Attorney, Agent, or Firm—Horst M. Kasper

[57] ABSTRACT

The present invention provides a method of and an apparatus for regulating an electrically regulated brake circuit of a multi-circuit brake mechanism with pressure medium activated brakes. To decrease the expense of such multi-circuit brake mechanism, the invention transforms the pressure, modulated by the brake actuating mechanism, to an electrical signal and regulates or co-regulates the electrically regulated brake circuit (II) by this electrical signal.

9 Claims, 6 Drawing Sheets

METHOD OF AND AN APPARATUS FOR REGULATING AN ELECTRICALLY REGULATED BRAKE CIRCUIT OF A MULTI-CIRCUIT BRAKE MECHANISM

FIELD OF THE INVENTION

The present invention relates, in general, to electrically regulated multi-circuit brake equipment and, more particularly, this invention relates to a method of and an apparatus for regulating at least one electrically regulated brake circuit of a multi-circuit brake mechanism having a plurality of brake cylinders actuated by a fluid pressure medium.

BACKGROUND OF THE INVENTION

Prior to the present invention, equipment for regulating electrically regulated brake circuits of a multi-circuit brake mechanism and method of operating such brake circuits have been taught in the prior art. One such method and braking system is taught, for example, in FIG. 2 of EP-B-0 088 911. In this prior art publication, each of the brake circuits is capable of being regulated electrically as well as by fluid pressure signals. In this prior art system, these pressure signals are at relay valves 30, 31, 37, and 38. Because a brake pressure modulator used in this system is a rather expensive device, as a result of its complexity, the disclosed brake circuits are also expensive. This is particularly the case because at least two such brake pressure modulators are required for this system.

In a multi-circuit brake mechanism consisting of at least one electrically regulated brake circuit and at least one brake circuit that is regulated by the pressure signal, as taught in the prior art, the disadvantage exists that the pressure buildup of the electrically regulated brake circuit generally will lead the pressure buildup of the pressure regulated brake circuit. This condition normally will result in a non-uniform wear of the brake linings of a vehicle or, in the case of a vehicle combination, of another vehicle. Such vehicle combination, for example, being a tractor-trailer combination.

SUMMARY OF THE INVENTION

The present invention provides a method of and an apparatus for regulating at least one electrically regulated brake circuit of a multi-circuit brake mechanism having fluid pressure medium activated brakes. According to the present invention, the multi-circuit brake mechanism includes a brake actuating mechanism. Such brake actuating mechanism is positioned on such vehicle and modulates a pressure. Such modulated pressure depends on at least one of an activating force applied to the brake actuating mechanism and an activating travel distance of at least one movable member of such brake actuating mechanism. In the multi-circuit brake arrangement, there is at least one electrically regulated brake circuit positioned on such vehicle to apply and release a portion of such plurality of brakes. Additionally, such multi-circuit brake arrangement must include at least one brake circuit positioned on such vehicle which is activated by the modulated pressure. Finally, a means is positioned on the vehicle which transforms such modulated pressure into an electrical signal. This electrical signal depends on the magnitude of the modulated pressure. The at least one electrically regulated brake circuit is at least co-regulated by this electric signal.

OBJECTS OF THE INVENTION

It is, therefore, one of the primary objects of the present invention to provide a method of and an apparatus for regulating an electrically regulated brake circuit of a multi-circuit brake mechanism which, by relatively simple means, such method and apparatus can be implemented at a lower cost than with prior art brake mechanisms.

Another object of the present invention is to provide a method of and an apparatus for regulating an electrically regulated brake circuit of a multi-circuit brake mechanism which can be used in conjunction with any suitable fluid pressure mechanism.

Still another object of the present invention is to provide a method of and an apparatus for regulating an electrically regulated brake circuit of a multi-circuit brake mechanism which will provide a more uniform wear of the brake linings.

A further object of the present invention is to provide a method of and an apparatus for regulating an electrically regulated brake circuit of a multi-circuit brake mechanism in which the pressure signal of the brake circuit that is regulated by the pressure signal can be supplied directly to the brakes as braking pressure.

An additional object of the present invention is to provide a method of and an apparatus for regulating an electrically regulated brake circuit of a multi-circuit brake mechanism which will enable the use of a conventional relay valve in place of one or more pressure modulators to achieve a more cost effective approach in obtaining a decrease in response time of the brake system.

In addition to the above-described objects and advantages of the method of and an apparatus for regulating an electrically regulated brake circuit of a multi-circuit brake mechanism, various other objects and advantages of the present invention will become more readily apparent to those persons who are skilled in the vehicle braking art from the following more detailed description of the invention, particularly when such description is taken in conjunction with the attached drawings and with the appended claims.

BRIEF DESCRIPTION OF THE INVENTION

Figure 1:
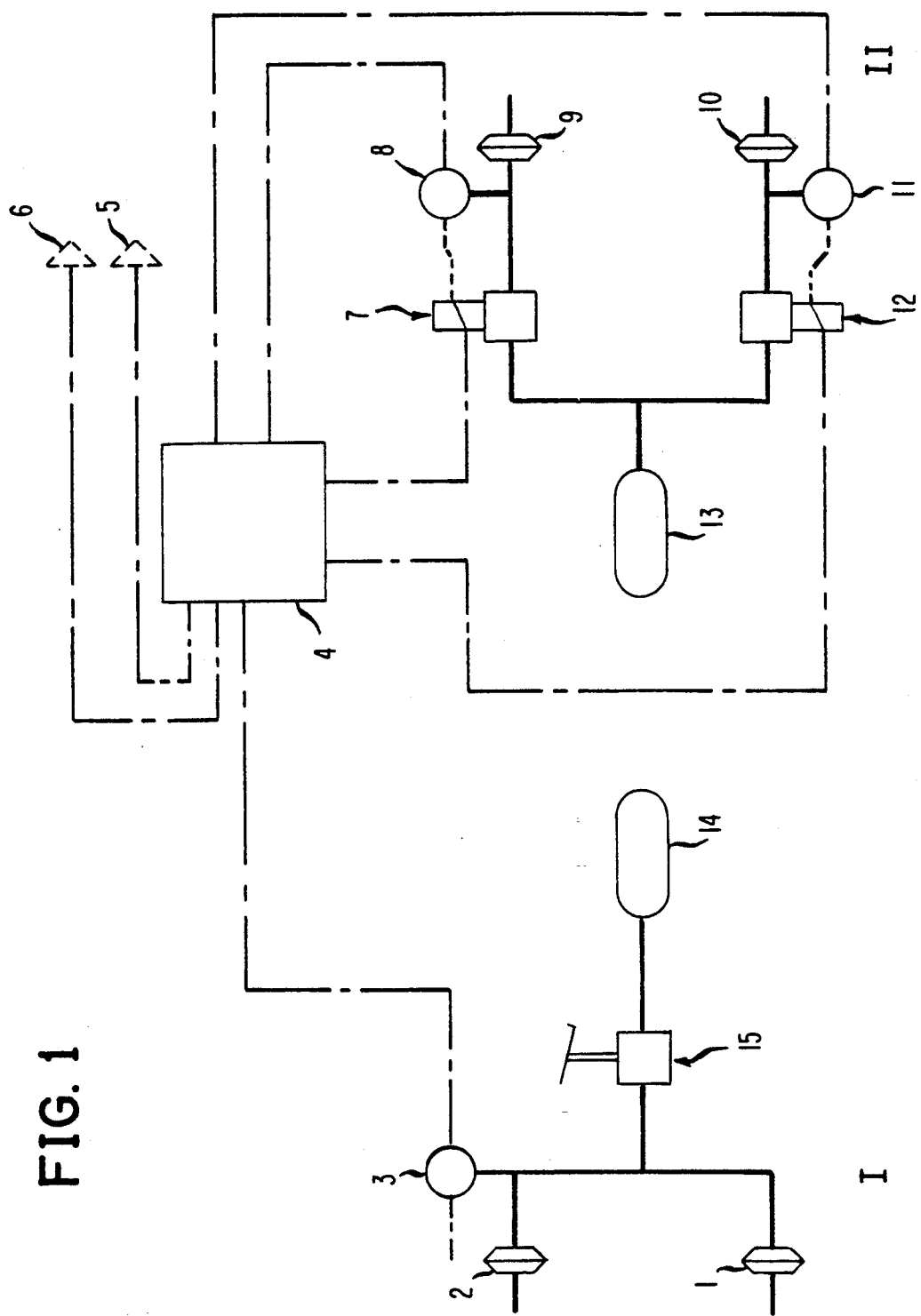
FIG. 1 is a schematic diagram which illustrates a multi-circuit brake mechanism incorporating the apparatus of the present invention.

Prior to proceeding to the detailed description of the present invention, it should be noted that in each of the views illustrating such invention there are identical components having identical functions which have been identified with identical reference numerals.

It should, likewise, be noted that solid lines have been used to designate the fluid pressure medium connecting lines, and dash-dotted lines have been used to designate the required electrical connections.

Now refer more particularly to FIG. 1. Illustrated therein is a multi-circuit brake mechanism which includes a pressure signal regulated brake circuit and an electricity regulated brake circuit which, in general, are identified as I and II, respectively.

The multi-circuit brake mechanism further includes a brake actuating mechanism that modulates the pressure. Such modulated pressure depends on the supplied activation force and/or the activation travel. Such brake actuating mechanism 15 is known, for example, from the WABCO Westinghouse publication 461 106 dated Aug. 1973.

Figure 2:
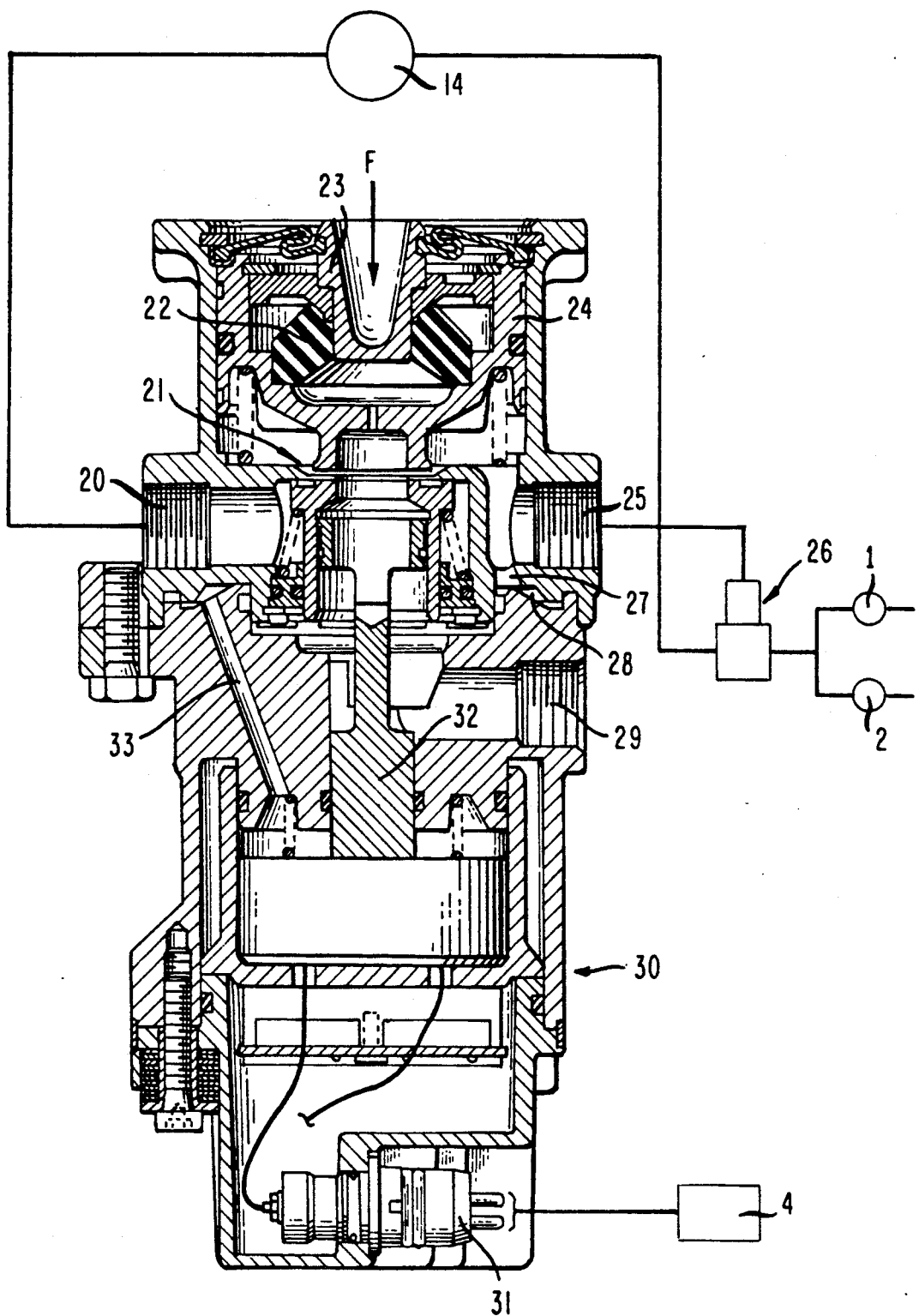
FIG. 2 is a view, partially in cross-section, which illustrates a brake actuating mechanism equipped with a pressure sensor positioned within the housing.

The brake circuit (I) that is activated by the modulated pressure of the brake actuating mechanism 15, comprises a fluid pressure medium supply 14, the brake actuating mechanism 15, and fluid pressure medium actuated brakes 1 and 2. The fluid pressure that is activated by the brake actuating mechanism 15 is supplied directly to the brakes 1 and 2 as brake pressure. It can also be used to regulate the brake pressure through a relay valve, as indicated in FIG. 2. Also, other customary devices (e.g., brake force regulator, rapid release valve, etc.) can be incorporated into the brake circuit (I). For simplicity, this brake circuit will be identified in the following description as a fluid pressure regulated brake circuit (I).

The electrically regulated brake circuit (II) comprises a fluid pressure medium supply 13, pressure-medium activated brakes 9 and 10, a fluid pressure sensor 3 associated with the fluid pressure regulated brake circuit (I), and an electric regulating device 4, 7, 12, 8 and 11 for the brake pressure.

The feed of the fluid pressure medium supply 13 and 14 occurs in a known manner through a pressurization device, which is not shown.

The fluid pressure sensor 9 is so designated that it measures the pressure that is modulated by the brake actuating mechanism 15 (and that is supplied to the brakes 1 and 2 as brake pressure) and so that it transforms this pressure to an electrical signal, which will be explained below in detail.

The brake pressure regulating device 4, 7, 12, 8 and 11 comprises regulating electronics 4 the input of which is connected to the output of the fluid pressure sensor 3, electrically regulated pressure modulators 7 and 12, and brake pressure sensors 8 and 11. The pressure modulators 7 and 12 are electrically connected after the regulating electronics 4 and check the instantaneous connection of one of the brakes 9 or 10 to the fluid pressure medium supply 13. The brake pressure sensors 8 and 11 measure the supplied brake pressure of the respective brake 9 and 10, and send a corresponding electrical signal to the regulating electronics 4. The brake pressure sensors 8 and 11, that are shown as separate elements, can be integrated in the respective pressure modulator 7 and 12, respectively.

In the above-described basic design, the example functions as follows:

Upon activating the brake actuating mechanism 15, the brakes 1 and 2 are supplied with a brake pressure from the fluid pressure medium supply 14. This brake pressure is a function of at least one of the activating force and/or the activation travel supplied to the brake actuating mechanism 15. The pressure sensor 3 measures this brake pressure and transforms it to an electrical signal. Such electrical signal is supplied as a regulating signal to the brake pressure regulating device 4, 7, 12, 8 and 11, more accurately: to the regulating electronics 4.

Upon receiving this regulating signal, the regulating electronics 4 communicates to the pressure modulator 7 or 12, respectively, an individual electrical signal that depends on it; the pressure modulators 7 and 12 then transmit, until the decay of this electrical signal, the pressure from the fluid pressure medium supply 13 to the brakes 9 and 10 as the brake pressure. The decay of the electrical signal occurs when regulating electronics 4 determines equality between the electrical signals of the fluid pressure sensors 8 and 11 and the electrical signal supplied as the regulating signal from the fluid pressure sensor 3. The brake pressure regulating device 4, 7, 12, 8 and 11 thus forms a regulating circuit for the brake pressures of the brakes 9 and 10.

From the above discussion, it follows that the described functions in the electrically regulated brake circuit (II) are triggered by the electrical signal of the fluid pressure sensor 3 and depend on it. Thus, in the example, a method is achieved by which the pressure modulated by the brake actuating mechanism 15 is transformed to an electrical signal that is a function of the pressure, and the electrically regulated brake circuit (II) is at least co-regulated by this electrical signal. The aspect of "co-regulation" will be discussed later. The example, therefore, describes a multi-circuit brake mechanism which requires only little expense for the regulation of the electrically regulated brake circuit (II) in the form of the fluid pressure sensor 3.

From the description of the function, it also follows that the electrically regulated brake circuit (II) follows the pressure regulated brake circuit (I). Although, because of its electric regulation, the potentially more rapid brake circuit (II) is slowed down by it, this is advantageous (see above) in favor of adjusting to the brake circuit (I).

The basic embodiment described so far can be further developed in many ways, a few of which are indicated in FIG. 1 by dashed lines.

For example, 5 and 6 designate sensors that detect certain vehicle parameters and transform them to electrical signals. These sensors are electrically connected to the inputs of the regulating electronics 4. The regulating electronics 4 in this instance is so designated that it forms a corrected signal or corrected signals from the regulating signal supplied by the fluid pressure sensor 3 and the electrical signals from the sensors 5 and 6 for the pressure modulators 7 and 12, and turns it or them off when it determines equality between the electrical signals of the fluid pressure sensors 8 and 11 and the corrected signal(s). The brake pressure supplied to the brakes 9 and 10 depends in this instance not only on the regulating signal originating from the fluid pressure sensor 3, but also on the vehicle parameters determined by the sensors 5 and 6. In other words, in this embodiment, the electrically regulated brake circuit (II) is "only" co-regulated by the electrical signal of the fluid pressure sensor 3. In this context, any parameter relevant to the brake behavior of the vehicle is important. For example, to be considered are the load condition of the vehicle and/or the load condition of the axle(s) which are associated with the electrically regulated brake circuit (II), the speed of vehicle travel, the force in the coupling between tractor and trailer, etc.

FIG. 2 shows a brake value detector, in the housing of which is also located in a pressure sensor 30.

The upper part of the drawing represents the brake actuating mechanism which again corresponds to that already mentioned in the WABCO Westinghouse publication 461 106. The activation force (F) supplied to the brake actuating mechanism through a thrust piece 23 acts through a governing spring 22 on an activating piston 24, that is acted upon in the opposite direction from an unidentified chamber and by a modulated pressure existing at an outlet 25. The activating piston 24 activates a combined inlet and outlet valve 21 through which the chamber and the outlet 25 can be connected by way of an inlet 20 to the fluid pressure medium supply 14 or through an outlet 29 to a fluid pressure release chamber. If air is used as the fluid pressure medium, the fluid pressure release chamber is usually the atmosphere.

The fluid chamber sensor 30 is located below the brake actuating mechanism. It receives the modulated pressure through a duct 27, 28 and 33 in the housing and issues and electrical signal corresponding to the pressure through a connector 31.

The example also indicates that, different than for the example in FIG. 1, the modulated pressure of the brakes 1 and 2 is supplied not directly as the brake pressure but as a regulating pressure to a relay valve 26, and the relay valve 26 takes over in a known manner the modulation of the brake pressure from the fluid pressure medium supply 14.

The basic embodiment described so far is further developed in the example, so that activation of the electrically regulated brake circuit (II) is ensured in the event the fluid pressure brake circuit (I) should fail. This case is characterized by a modulated pressure, that would be sufficiently high to bring the activating piston 24 in equilibrium with the activating force (F), not being able to build up at the activating piston 24 and thereby at the outlet 25.

For this purpose of this further development, a plunger 32 is located between the activating piston 24 and the fluid pressure sensor 30, the stroke of the plunger 32 in the direction of the activating force (F) being limited with the simultaneous limitation of the activating piston 24 stroke in this direction by the fluid pressure sensor 30. For the same purpose, the fluid pressure sensor 30 is, in addition to being a fluid pressure sensor, also designated as a force sensor.

When the fluid pressure regulated brake circuit (I) is intact, the plunger 32 permits free movement of the activating piston 24 in the relation to the fluid pressure sensor 30. When the fluid pressure regulated brake circuit (I) has failed and the brake actuating mechanism is activated, however, the plunger 32 is locked in between the activating piston 24 and the fluid pressure sensor 30, and the activating force (F) or respectively that portion of the modulated pressure which is not equalized (residual fluid pressure) is transmitted from the activating piston 24 to the plunger 32 and from it to the fluid pressure sensor 30.

Depending on whether the brake actuating mechanism still modulates a residual pressure or not, this residual fluid pressure and the unequalized portion of the activating force (F) or the entire activating force (F) acts on the fluid pressure sensor 30. This means that the fluid pressure sensor 30, even upon failure of the fluid pressure regulated brake circuit (I), always supplies an electrical signal, that corresponds to the full activating force (F), to the regulating electronics 4 as a regulating signal.

In the example the end of the plunger 32 facing the activating piston 24 penetrates the body of the dual valve 21 with axial clearance to an inner shoulder of this valve body. Other detailed embodiments are also possible, for example, the face of the valve body facing away from the activating piston 24 could oppose the face of the plunger 32. In both cases, upon failure of the fluid pressure regulated brake circuit (I), the valve body participates in the force flux between the activating piston 24 and the plunger 32.

The plunger 32 can also, in a non-depicted manner, completely penetrate such valve body and with a separation of the valve body from the force flux through the valve body it could come directly in contact with the activating piston 24, or it could be fashioned in one piece with it.

Figure 3:
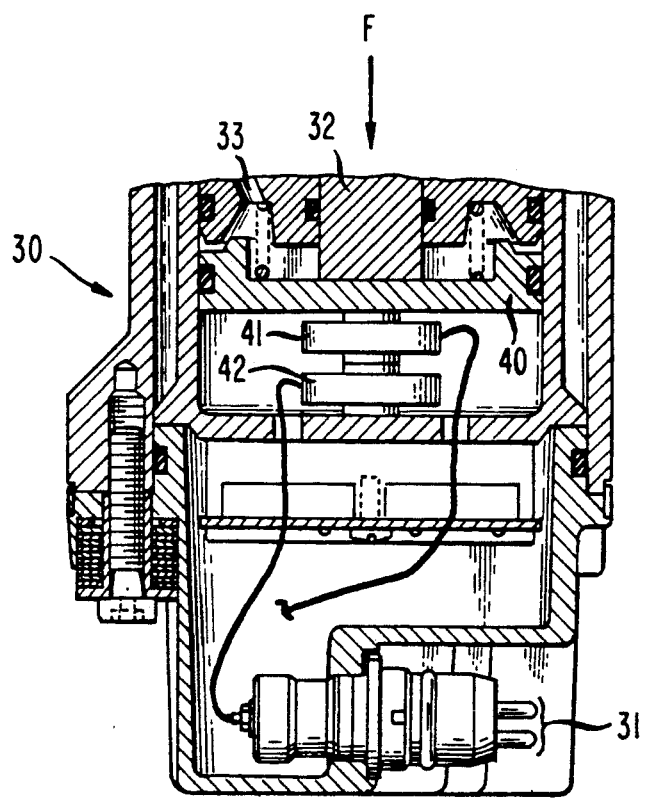
FIG. 3 is a fragmented view, partially in cross-section, which illustrates certain details of the pressure sensor illustrates in FIG. 2.
Figure 4:
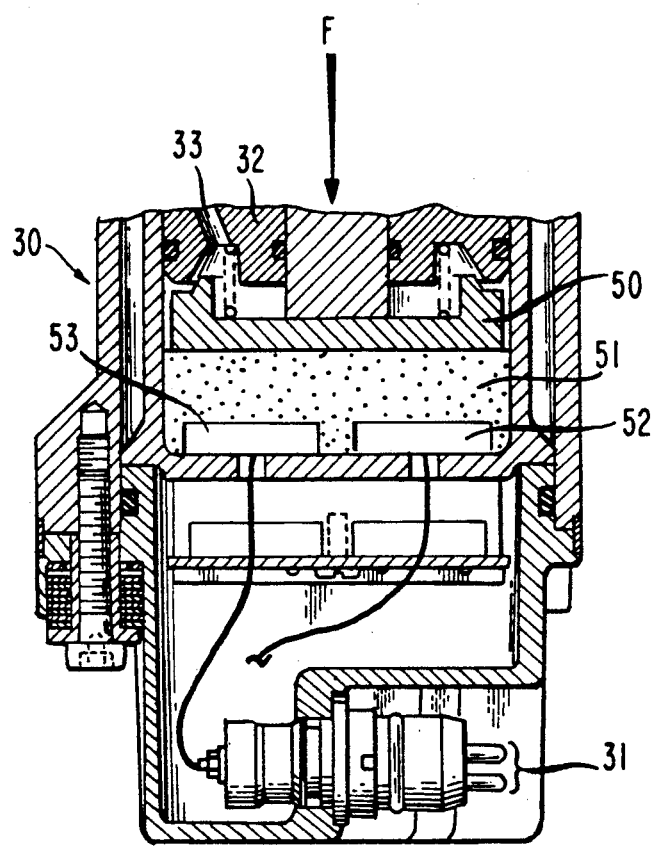
FIG. 4 is a fragmented view, partially in cross-section, which illustrates certain details of a pressure sensor illustrated in FIG. 2.

FIGS. 3 and 4 show in detail segments of a brake actuating mechanism that in FIG. 2 was referred to in general as the fluid pressure sensor 30.

In FIG. 3, the fluid pressure sensor comprises a force sensor 41 and 42 and a pressure plate 40 that is sealed and movable in the direction of the effective axis of the activating force (F). The pressure plate 40 is located between the force sensor 41 and 42 and the facing end of the plunger 32.

When the fluid pressure regulated brake circuit (I) is intact, the modulated pressure acts through the housing duct 27, 28 and 33 on the pressure plate 40, which converts the pressure with the aid of its correspondingly sized effective surface to a force of a magnitude of the supplied activating force (F), and transmits it to the force sensor 41 and 42 which then produces an electrical signal that corresponds to the modulated pressure or respectively to the activating force (F).

When, upon failure of the fluid pressure regulated brake circuit (I), the brake actuating mechanism is activated, the residual fluid pressure, if present, and the unequalized portion of the activating force (F) or respectively the full activating force (F) acts on the pressure plate 40, and transmits the resulting force, that again corresponds to the activating force (F), or respectively only the activating force (F) to the force sensor 41 and 42.

In the embodiment of the fluid pressure sensor 30 shown in FIG. 4, a pressure receiver 52 and 53 facing the plunger 32 is embedded into a mass 51 of a quasi-hydraulic material. "Quasi-hydraulic" is a solid material in which the pressure propagates or distributes as in a liquid. Preferred materials of this type are elastomers. Between the end of the plunger 32, that faces the mass 51, and the mass 51 is located a force distributing plate 50 that is movable in the direction of the effective axis of the activating force (F).

The force distributing plate 50 is not sealed against the housing. Upon activation of the brake actuating mechanism, the modulated pressure or the residual fluid pressure can therefore act directly on the mass 51 and thereby on the pressure receiver 51 and 52. Upon failure of the fluid pressure regulated brake circuit (I), only the activating force (F) or respectively its portion not equalized by the residual fluid pressure is transferred through the surface of the pressure distributing plate 50, that faces the mass 51, to the mass 51 and it is transformed to pressure or (if a residual fluid pressure still exists) to additional pressure.

The pressure transmitted through the mass 51 to the pressure receiver 52 and 53 is transformed by it into the electrical signal.

The pressure receiver 52 and 53 can also be embedded in any different receiver in the quasi-hydraulic material giving the same action.

This embodiment in comparison with the embodiment shown in FIG. 3 has the advantage that the electrical signal can be affected only by the tolerance-related inaccuracies of the pressure receiver 52 and 53, whereas the other embodiment can exhibit inaccuracies, in addition to the inaccuracies of the force sensor 41 and 42, related to fabrication tolerances of the pressure plate 40 and/or of the associated region of the housing, and related to the seal (e.g., by friction of the sealing elements) of the pressure plate 40.

Figure 5:
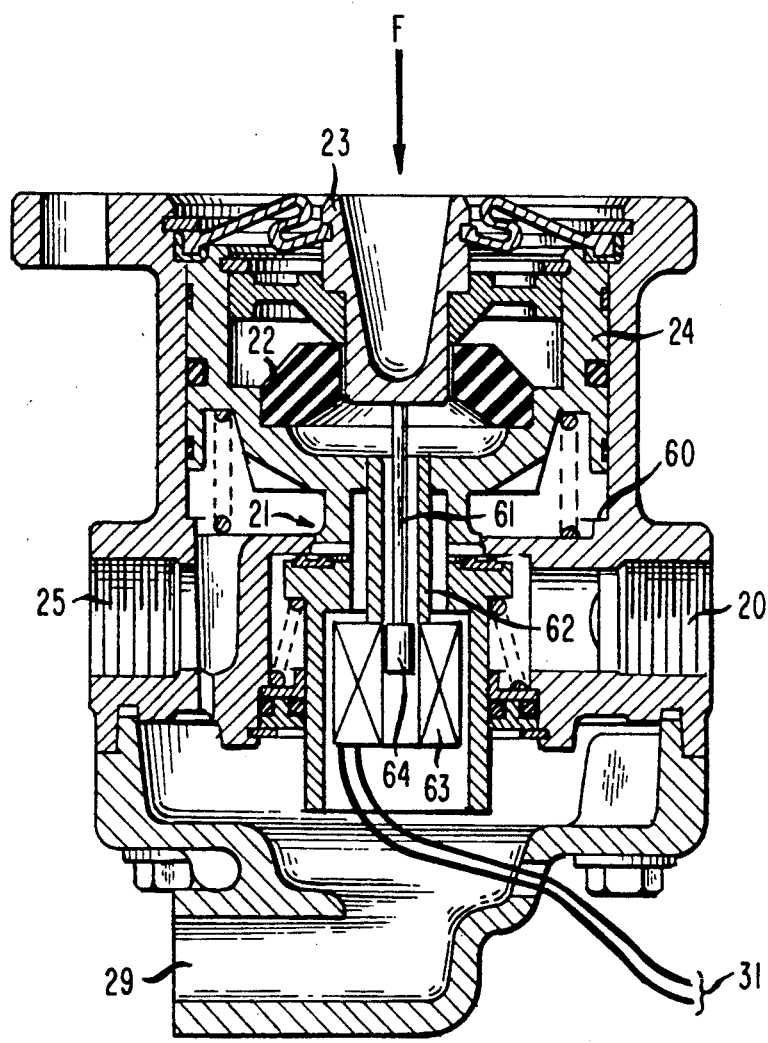
FIG. 5 is a cross-sectional side elevation view which illustrates an alternative embodiment of the brake actuating mechanism having a pressure sensor positioned within the same housing.

FIG. 5 shows a different embodiment of a brake actuating mechanism with a pressure sensor being located in its housing.

The brake actuating mechanism itself corresponds to those of the earlier examples. Primarily the governing spring 22 is of special importance. The governing spring 22 is located between the thrust piece 23 and the activating piston 24 and has an installation height (s), when the brake actuating mechanism is not activated, as shown. Upon activating the brake actuating mechanism, the activating force (F), through the thrust piece 23, on the one side, and the activating piston 24 on the other side act on the governing spring 22, with the force corresponding to the modulated pressure. This decreases the height of the governing spring 22 by the spring deflection that depends on these forces. Simultaneously the thrust piece 23 and the activating piston 24 approach each other by the amount of this deflection.

In this case, a pressure sensor identified as 63 and 64 is fashioned as a travel sensor, which takes the deflection of the governing spring 22 as a measure of the modulated pressure. The travel sensor serving as a pressure sensor 63 and 64 consists in a known manner of a stator 63 and a plunger armature 64, and generates an electrical signal, as a travel signal or respectively as a pressure signal, that corresponds to the penetration of the plunger armature 64 into the stator 63. The stator 63 is connected to the activating piston 24 through a connecting member 62, and the plunger armature 64 is connected to the thrust piece 23 through another connecting member 60. Thus, the pressure sensor 63 and 64 determines the governing spring 22 deflection in the form of the related approach between the thrust piece 23 and the activating piston 24.

In the example, the connecting member 62 is designed as a tube, and the second connecting member 61 as a rod that penetrates this tube. The pressure sensor 63 and 64 in the example is located inside the valve body of the valve 21. Any other appropriate arrangement of the pressure sensor can be employed, for example, outside the housing or between the activating piston 24 and the thrust piece 23, as well as any other suitable connection of its components to the activating piston 24 or respectively to the thrust piece 23.

Also, this embodiment can be further developed beyond the above-described basic design so that, even upon failure of the fluid pressure regulated brake circuit (I), the activation of the electrically regulated brake circuit (II) is ensured. For this purpose, a stop 60 is provided on the unidentified housing, which stop 60 limits the stroke of the activating piston 24 in the direction of the activating force (F). If, as a result of failure of the fluid pressure regulated brake circuit (I), no modulated pressure or only modulated residual fluid pressure acts on the activating piston 24 and thus at the outlet 25, then the activating piston 24 is pushed against the stop 60. Then the reaction force of the stop 60 in addition to the residual fluid pressure act on the governing spring 22 in a direction opposite that of the activating force (F). The governing spring 22 deflection and thereby also the signal generated by the pressure sensors 63 and 64 are at a given activating force exactly the same as in intact fluid pressure regulated brake circuit (I).

Figure 6:
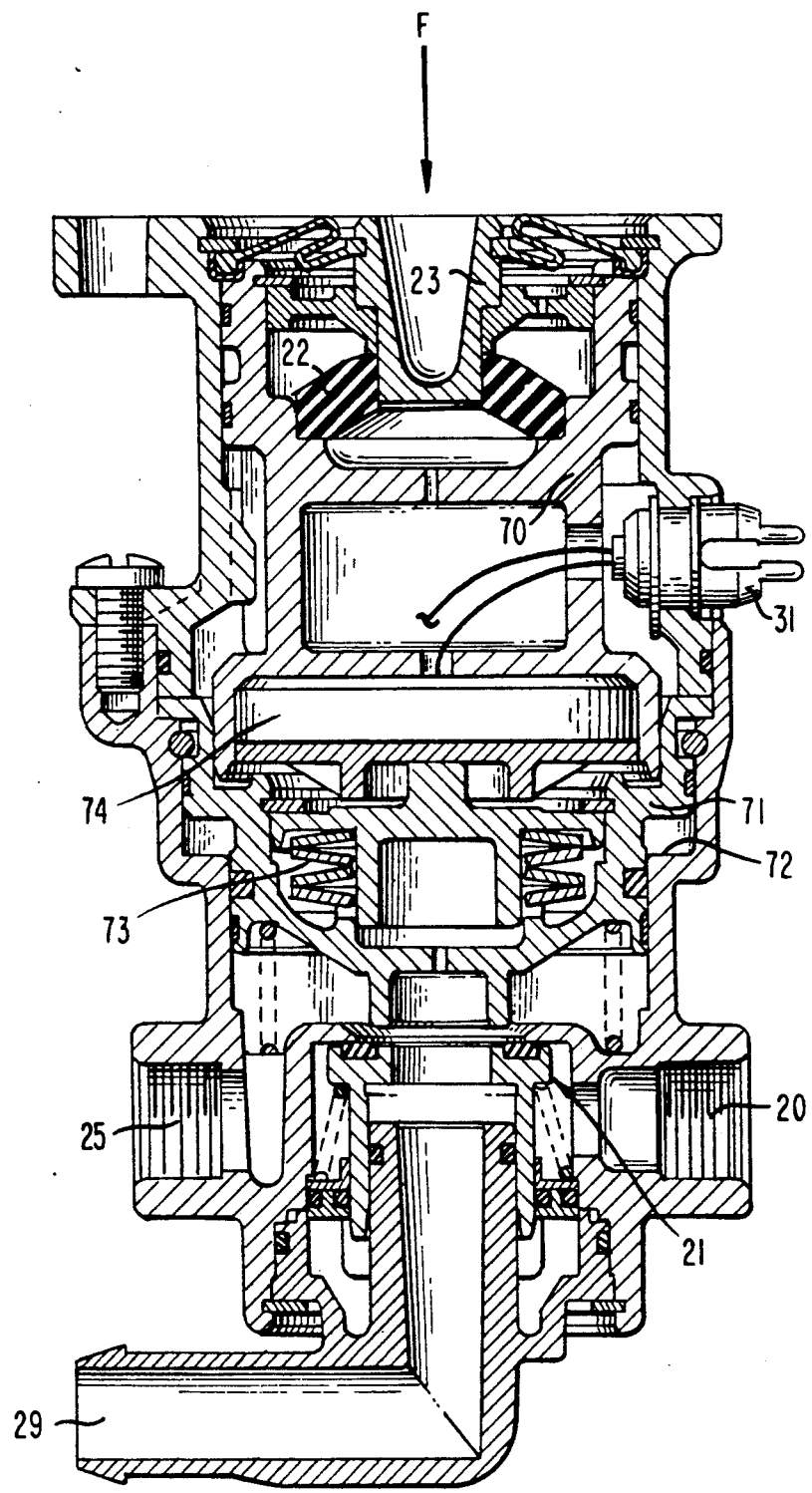
FIG. 6 is a cross-sectional side elevation view which illustrates another alternative embodiment of the brake actuating mechanism having a pressure sensor positioned within the same housing.

The brake actuating mechanism shown in FIG. 6 also contains the pressure sensor to be identified as 70, 71 and 74 in the housing of the brake actuating mechanism. As indicated by partial use of a previous identification marks, this brake actuating mechanism corresponds to the previous embodiments plus the deviations described below.

The activating piston, identified here as 70 and 71, is subdivided into a piston part 70 to which a load is applied by the actuating force (F) and into a piston part 71 to which a load is applied by the modulated pressure, and the two piston parts 70 and 71 are movable against each other. Between the two piston parts 70 and 71 is located a force sensor 74 through which the piston parts 70 and 71 bear against each other under the influence of the activating force (F) on the one side and the modulated pressure on the other side. Thus the modulated pressure that corresponds to the supplied activating force (F) acts on the force sensor 74 and generates an electrical signal that corresponds to the modulated pressure and supplies this electrical signal to the connector 31.

In this case the pressure sensor 70, 71 and 74, therefore, is formed by piston parts 70 and 71 and the force sensor 74.

This embodiment is also further developed beyond the above-described basic design so that, also upon failure of the fluid pressure regulated brake circuit (I), the activation of the electrically regulated brake circuit (II) is ensured.

For this purpose, a stop 72 is provided on the unidentified housing, which stop 22 limits the stroke of the piston part 71 in the direction of the supplied activating force (F). If, a result of failure of the fluid pressure regulated brake circuit (I), no modulated pressure or only modulated residual fluid pressure acts on the piston part 71 and thus at the outlet 25, then the pressure sensor 70, 71 and 74 is pushed against the stop 72 by the activating force (F) or by its non-equalized portion. Thereby the piston part 70 can supply the activating force (F) or its unequalized portion to the force sensor 74, so that it, as in the preceding embodiment, can always supply an electrical signal that corresponds to the full activating force (F), also upon failure of the fluid pressure regulated brake circuit (I).

In a further development, the embodiment provides a means for the protection of the force sensor 74 against overload. Toward this end is used a captive spring element 73 in the piston part 71 and related unidentified support and structural components. If forces below the overload limit of the force sensor 74 are to be transmitted between the force sensor 74 and the piston part 71, then the captive spring element 73 transmits these forces. The captive spring element 73 is so dimensioned that it compresses completely when the force to be transmitted assumes the level of the overload limit. Thereby the piston parts 70 and 71 can come into contact with each other, so that the greater force bypasses the force sensor 74 and is transmitted directly between the piston parts 70 and 71. The overload limit can be reached when the piston part 71 abuts against the stop 72 and the activating force (F) exceeds a limit that is basic to the arrangement.

It is obvious that a captive spring element 73 for this purpose could also be located at the other piston part 70 or it could be divided between both piston parts 70 and 71.

Because in the embodiment, according to FIG. 1, to each of the brakes 9 and 10 are assigned an individual pressure modulator 7 or 12 and an individual pressure sensor 8 or 11, and when the regulating electronics 4 supplies individual electrical signals to each pressure modulator 7 or 12, the brake pressure of each brake 9 or 10 can be individually regulated. By sacrificing braking comfort, the brakes 9 and 10, in a manner not shown, can be assigned on one pressure modulator and only one pressure sensor with corresponding simplification of the regulating electronics 4, thereby achieving a cost-effective design. The expert realizes that for such a simplified design the above discussions correspondingly apply.

It is obvious that, in a manner not shown, the embodiment can be expanded by one or several electrically regulated and/or pressure regulated brake circuits. Then the above discussions, for the construction of the electrically regulated brake circuit (II) as well as for its coupling to the fluid pressure regulated brake circuit (I), or to another fluid pressure regulated brake circuit, apply correspondingly to the additional electrically regulated brake circuit(s).

The expert recognizes that the discussions given in relation to the individual embodiments also apply to the other embodiments in a corresponding manner, as long as contradictions do not arise from these discussions.

It can be seen from the above description that the present invention avoids the disadvantage that, when a multi-circuit brake mechanism consisting of at least one electrically regulated brake circuit and at least one brake circuit that is regulated by the fluid pressure signal, the brake pressure buildup of the electrically regulated brake circuit would lead that of the pressure regulated brake circuit, thereby favoring non-uniform brake limiting wear of the vehicle or, in the case of a vehicle combination, of another vehicle.

This invention offers the advantage that the fluid pressure signal of the brake circuit that is regulated by the fluid pressure signal can be supplied directly to the brakes as brake pressure. This offers the possibility of a very simple and low-cost design of this brake circuit. Should aspects that are independent of the invention, for example, to decrease the response time, require a course of action in this brake circuit, the invention offers also in this case an inexpensive approach; it permits the use of a conventional relay valve instead of one or several pressure modulators.

Although a number of embodiments of the method of and apparatus for regulating an electrically regulated brake circuit of a multi-circuit brake mechanism have been described in detail above, it should be obvious to those persons who are skilled in the vehicle art that various other modifications and adaptations of the present invention can be made without departing from the spirit and scope of the appended claims.

We claim:

1. An apparatus for regulating at least one electrically regulated brake circuit of a multi-circuit vehicle brake mechanism having a plurality of brakes which are activated by a fluid pressure medium, said apparatus comprising:
    (a) a brake actuating mechanism positioned on each vehicle which modulates a pressure that depends on at least one of an activating force applied to said brake actuating mechanism and an activating travel distance of at least one member of said brake actuating mechanism;
    (b) at least one electrically regulated brake circuit positioned on such vehicle to apply and release a portion of said plurality of brakes;
    (c) at least one brake circuit positioned on such vehicle which is activated by modulated pressure;
    (d) a pressure sensor positioned on such vehicle for transforming said modulated pressure into an electric signal, said electric signal depends on a magnitude of said modulated pressure;
    (e) wherein said electrically regulated brake circuit includes an electric brake pressure regulating device positioned therein;
    (f) wherein an output of said pressure sensor is connected to communicate said electric signal to an input of said electric brake pressure regulating device;
    (g) and wherein said pressure sensor is disposed in a housing of said brake actuating mechanism.

2. An apparatus for regulating an electrically regulated brake circuit, according to claim 1, wherein said brake actuating mechanism includes an activating piston that is acted upon by said activating force on a first side and by said modulated pressure on a second side, and wherein said brake actuating mechanism further includes a plunger disposed intermediate said activating piston and said pressure sensor, said pressure sensor being further designed as a force sensor and being positioned to limit a stroke of said plunger in a direction of said activating force.

3. An apparatus for regulating an electrically regulated brake circuit, according to claim 2, wherein said pressure sensor includes a pressure receiver embedded in a mass of quasi-hydraulic material, at least in a direction toward said plunger, a force distributing plate is located between said mass and an end of said plunger facing it, said force distributing plate is movable in a direction of an effective axis of said activating force.

4. An apparatus for regulating an electrically regulated brake circuit, according to claim 2, wherein said pressure sensor comprises a force sensor and a pressure plate which is disposed intermediate said force sensor and one end of said plunger facing said pressure plate, said pressure plate is sealed and is movable in a direction of an effective axis of said activating force.

5. An apparatus for regulating an electrically regulated brake circuit, according to claim 1, wherein said brake actuating mechanism includes an activating piston that is acted upon by said activating force on a first side and by said modulated pressure on a second side, said activating force being supplied to said activating piston through a governing spring; and wherein said pressure sensor is a travel sensor that determines a spring deflection of said governing spring.

6. An apparatus for regulating an electrically regulated brake circuit, according to claim 5, wherein said brake actuating mechanism includes a stop positioned on a housing that limits a stroke of said activating piston in a direction of said activating force.

7. An apparatus for regulating an electrically regulated brake circuit, according to claim 1, wherein said brake actuating mechanism includes an activating piston that is acted upon by said activating force on a first side and by said modulated pressure on a second side;

wherein said activating piston is divided into a first portion that is acted upon by said activating force and a second portion that is acted upon by said modulated pressure; said first position and said second portion being movable against each other; and wherein said pressure sensor is formed by said first portion and said second portion of said activating piston and by a force sensor which is disposed intermediate said first portion and said second portion.

8. An apparatus for regulating an electrically regulated brake circuit, according to claim 7, wherein said brake actuating mechanism includes a stop positioned on a housing that limits a stroke of said second portion which is acted upon by said modulated pressure, said stop limiting said stroke in a direction of said activating force.

9. An apparatus for regulating an electrically regulated brake circuit, according to claim 7, wherein at least in one of said portions of said activating piston a captive spring is disposed through which said force bears against said at least one portion.

* * * * *